United States Patent
Um et al.

(10) Patent No.: US 8,194,214 B2
(45) Date of Patent: Jun. 5, 2012

(54) LIQUID CRYSTAL DISPLAY DEVICE

(75) Inventors: Yoon-Sung Um, Yongin-si (KR);
Jae-Jin Lyu, Yongin-si (KR);
Seung-Beom Park, Seoul (KR);
Hye-Ran You, Incheon (KR)

(73) Assignee: Samsung Electronics Co., Ltd. (KR)

( * ) Notice: Subject to any disclaimer, the term of this patent is extended or adjusted under 35 U.S.C. 154(b) by 250 days.

(21) Appl. No.: 12/619,514

(22) Filed: Nov. 16, 2009

(65) Prior Publication Data

US 2010/0123844 A1    May 20, 2010

(51) Int. Cl.
*G02F 1/1337* (2006.01)
(52) U.S. Cl. .................................... 349/129; 349/39
(58) Field of Classification Search ............ 349/129
See application file for complete search history.

(56) References Cited

U.S. PATENT DOCUMENTS

2007/0052902 A1* 3/2007 Yoo et al. .................. 349/144

FOREIGN PATENT DOCUMENTS

| KR | 1020070035224 A | 3/2007 |
| KR | 1020070052847 A | 5/2007 |
| KR | 1020080020883 A | 3/2008 |

* cited by examiner

*Primary Examiner* — Richard Kim
(74) *Attorney, Agent, or Firm* — Cantor Colburn LLP

(57) ABSTRACT

A liquid crystal display device includes a first substrate, a second substrate and a liquid crystal layer. The first substrate includes a lower substrate and a pixel electrode. The pixel electrode is disposed in a pixel area of the first substrate, in which a first slit part extending along a first direction in a first zigzag shape and a second slit part extending along a second direction and passing through a first bent portion of the first slit part are disposed. The second slit part includes first edges opposite to each other which are inclined at a first angle. The second substrate includes an upper substrate and a common electrode. The common electrode is disposed on the upper substrate, in which a third slit part disposed between adjacent first slit parts and extended in a second zigzag shape is disposed.

20 Claims, 13 Drawing Sheets

LIQUID CRYSTAL DISPLAY DEVICE

This application claims priority to Korean Patent Application No. 2008-114782, filed on Nov. 18, 2008, and all the benefits accruing therefrom under 35 U.S.C. §119, the contents of which are incorporated herein by reference in their entirety.

BACKGROUND OF THE INVENTION

1. Field of the Invention

Embodiments of the present invention relate to a liquid crystal display ("LCD") device. More particularly, embodiments of the present invention relate to an LCD device having a pixel electrode.

2. Description of the Related Art

A liquid crystal display ("LCD") device is a type of flat panel display device and is widely used. The LCD device includes two substrates, a liquid crystal layer interposed between the two substrates and a polarizer disposed on external surfaces of the substrates. The two substrates respectively have a pixel electrode and a common electrode for forming an electric field therebetween. The electric field formed by the pixel electrode and the common electrode is applied to the liquid crystal layer. When the electric field is applied to the liquid crystal layer, directors of the liquid crystal molecules of the liquid crystal layer are arranged according to the electric field. The LCD device displays images using the arranged liquid crystal molecules and the polarizer.

In a vertical alignment ("VA") LCD, the longitudinal axes of the liquid crystal molecules are vertically arranged with respect to the display substrates. Since the VA LCD has a high contrast ratio and a wide viewing angle, the VA LCD is widely used.

In order to improve the viewing angle of the VA LCD, slits or protrusions may be disposed on the pixel electrode and/or the common electrode. Since the pretilt direction of the liquid crystal molecules may be determined by the slits and the protrusions, the slits and the protrusions may arrange the liquid crystal molecules in various directions so that the viewing angle of the VA LCD may be improved.

Light efficiency may be best when the directors of the liquid crystal molecules are inclined at about 45° with respect to the polarization axis of the polarizer. The polarization axis of the polarizer may be perpendicular to the gate line or the data line. Thus, the slit or the protrusions may extend in a direction of about 45° with respect to the gate line or the data line.

Although the slit or the protrusions extends in the direction of about 45° with respect to the gate line or the data line, the directors of the liquid crystal molecules may not be inclined at about 45° with respect to the polarization axis of the polarizer. For example, the liquid crystal molecules adjacent to an edge of the pixel electrode or between adjacent pixel electrodes may be irregularly arranged, so that the light transmissivity of the pixel area may be reduced, and the response time of the liquid crystal layer may be increased.

When the width of a light-blocking pattern is increased in order to cover the irregular arrangement of the liquid crystal molecules, the aperture ratio of the pixel area may be decreased.

BRIEF SUMMARY OF THE INVENTION

Exemplary embodiments of the present invention provide an alignment substrate capable of improving the transmissivity of light and the response time of a liquid crystal layer.

In an exemplary embodiment of the present invention, there is provided a liquid crystal display ("LCD") device. The LCD device includes a first substrate, a second substrate and a liquid crystal layer. The first substrate includes a lower substrate, and a pixel electrode. The lower substrate includes a pixel area. The pixel electrode may be disposed in the pixel area. A first slit part and a second slit part may be disposed in the pixel electrode. The first slit part may extend along a first direction in a first zigzag shape. The second slit part may extend along a second direction substantially perpendicular to the first direction and passing through a first bent portion of the first slit part. The second slit part may include first edges opposite to each other. The first edges may be inclined at a first angle and may be substantially symmetrical to each other with respect to the second direction. The second substrate includes an upper substrate and a common electrode. The upper substrate faces the lower substrate. The common electrode is disposed on the upper substrate. A third slit part may be disposed in the common electrode. The third slit part may be disposed between adjacent first slit parts and may extend in a second zigzag shape. The liquid crystal layer is disposed between the pixel electrode and the common electrode.

The third slit part may include a domain dividing slit and a boundary slit. The domain dividing slit may extend along the first direction in the substantially zigzag shape. The boundary slit may correspond to the second slit part which is disposed along a boundary between adjacent pixel areas and may extend from a bent portion of the domain dividing slit toward a negative second direction. The boundary slit may extend to the first bent portion of the first slit part and a width between second edges of the boundary slit opposite to each other may be greater than a width between the first edges of the second slit part.

A plurality of first slit parts, each having a substantially inverted V-shape, may be disposed along the positive second direction in each pixel area. The domain dividing slit may be disposed between adjacent first slit parts of the plurality of first slit parts. The domain dividing slit and the boundary slit may be connected to each other to form a substantially Y-shape.

The lower substrate may include a lower base substrate, a gate line, a data line, and a switching element. The lower base substrate may include a pixel area. The gate line may be disposed between the lower base substrate and the pixel electrode. The gate line may extend in the first direction. The data line may be disposed between the lower base substrate and the pixel electrode. The data line may correspond to the second slit part and may extend in the second direction. The switching element may include a gate electrode extending from the gate line, a source electrode extending from the data line and a drain electrode electrically connected to the pixel electrode. The upper substrate may include an upper substrate, a light-blocking pattern and a color filter. The common electrode may be disposed on the upper substrate. The light-blocking pattern may be disposed between the upper substrate and the common electrode to correspond to the switching element, the gate line and the data line. The color filter may be disposed on a portion of the upper substrate exposed by the light-blocking pattern. The color filter may correspond to the pixel area. Third edges of the first slit part, which are opposite to each other, and fourth edges of the domain dividing slit, which are opposite to each other, may include a depressed notch or a raised notch. A singular point may be generated in a region between the first edges, which is covered by the light-blocking pattern, when an electric field is applied to the liquid crystal layer.

In an exemplary embodiment of the LCD device, liquid crystal molecules adjacent to an edge of a pixel electrode and/or between adjacent pixel electrodes may be substantially uniformly arranged, so that the light transmissivity of a pixel area and the response time of a liquid crystal layer may be improved.

BRIEF DESCRIPTION OF THE DRAWINGS

The above and other features and advantages of the present invention will become readily apparent by reference to the following detailed description when considered in conjunction with the accompanying drawings wherein.

DETAILED DESCRIPTION OF THE INVENTION

Figure 1:
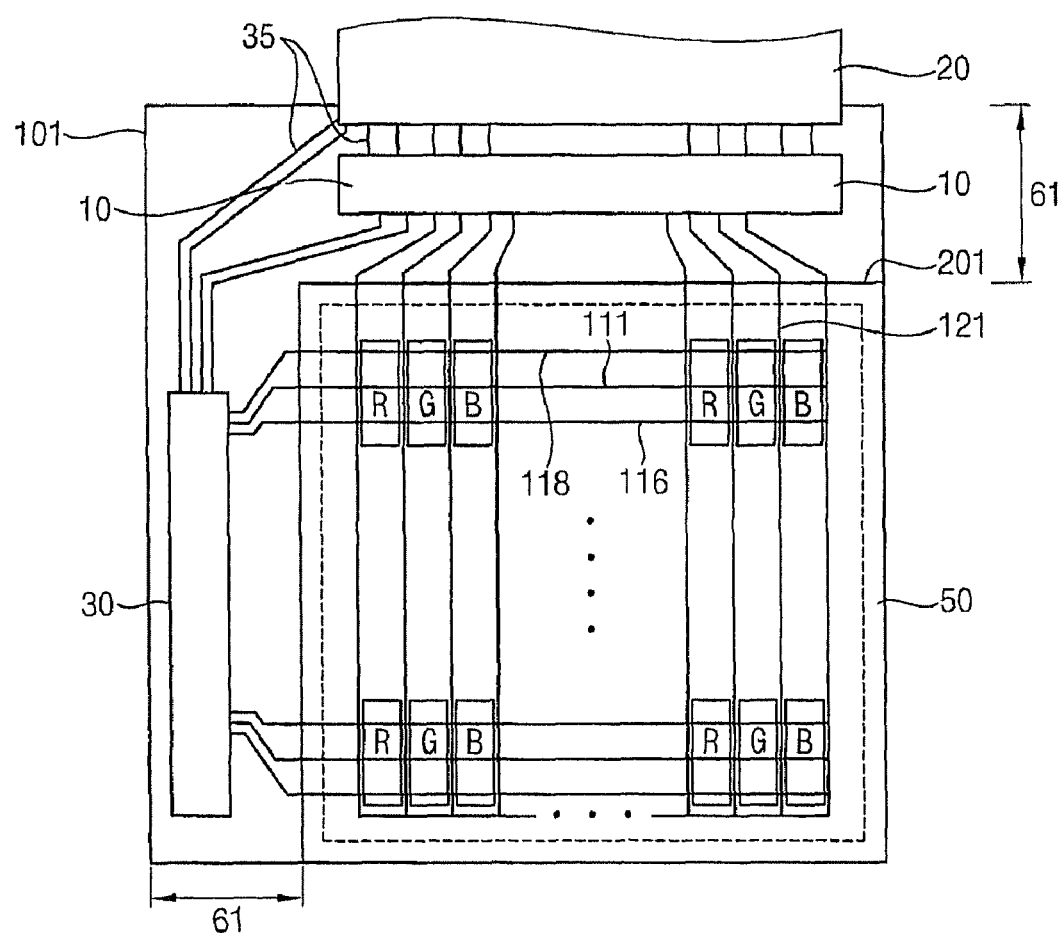
FIG. 1 is a perspective view illustrating a liquid crystal display ("LCD") device in accordance with Embodiment 1 of the present invention.
Figure 1:
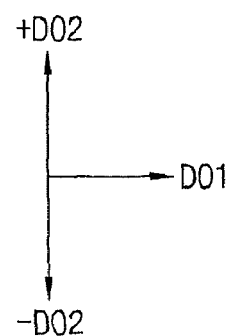

The present invention is described more fully hereinafter with reference to the accompanying drawings, in which exemplary embodiments of the present invention are shown. The present invention may, however, be embodied in many different forms and should not be construed as limited to the exemplary embodiments set forth herein. Rather, these exemplary embodiments are provided so that this disclosure will be thorough and complete, and will fully convey the scope of the present invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "lower," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "lower" relative to other elements or features would then be oriented "upper" the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular exemplary embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the invention are described herein with reference to cross-sectional illustrations that are schematic illustrations of idealized exemplary embodiments (and intermediate structures) of the present invention. As such, variations from the shapes of the illustrations as a result, for example, of manufacturing techniques and/or tolerances, are to be expected. Thus, exemplary embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention used herein.

Hereinafter, the present invention will be explained in detail with reference to the accompanying drawings.

Embodiment 1

FIG. 1 is a perspective view illustrating a liquid crystal display ("LCD") device in accordance with Embodiment 1 of the present invention.

Referring to FIG. 1, an LCD device 100 in accordance with Embodiment 1 of the present invention includes an array substrate 101, an opposing substrate 201 and a liquid crystal layer. The opposing substrate 201 faces the array substrate 101. The array substrate 101 and the opposing substrate 201 may be combined with each other by a sealing member 50 having a substantially frame shape. A space defined by the array substrate 101, the opposing substrate 201 and the sealing member 50 corresponds to a display region and is filled with liquid crystal. The liquid crystal filling the space forms the liquid crystal layer.

The opposing substrate 201 may be a color filter substrate including a red color filter, a green color filter and a blue color filter. The array substrate 101 may be a switching substrate including a switching element which drives the switching substrate using an active matrix driving method.

The array substrate 101 may have a substantially rectangular shape having a width in a horizontal direction and a height in a vertical direction. Hereinafter, the horizontal direction and the vertical direction are referred to as a first direction D01 and a second direction D02, respectively. The first direction D01 may be substantially perpendicular to the second direction D02. The second direction D02 may include a positive second direction +D02 and a negative second direction −D02 as illustrated in FIG. 1.

Figure 2:
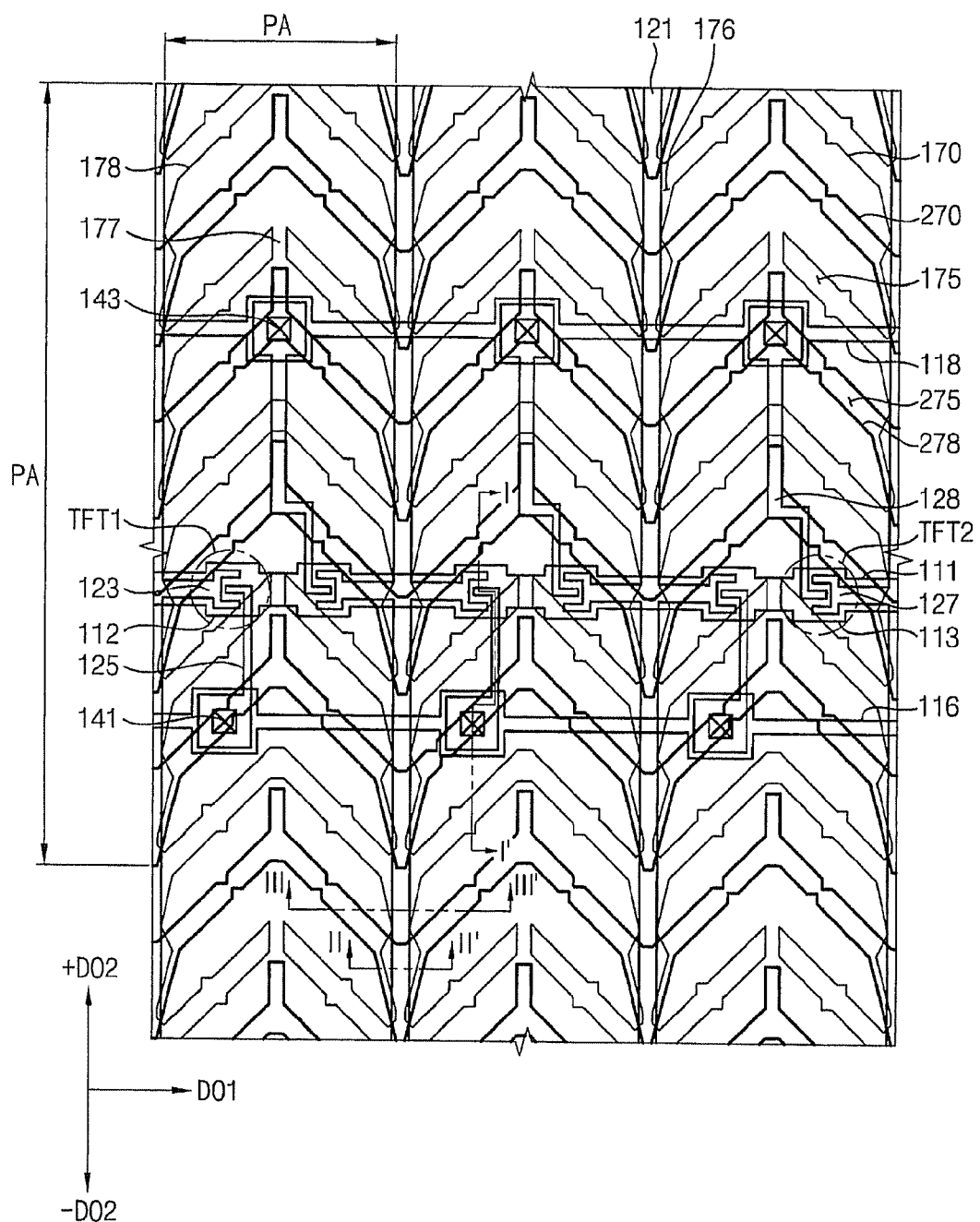
FIG. 2 is a plan view illustrating an exemplary embodiment of pixel areas of the LCD device illustrated in FIG. 1.
Figure 3:
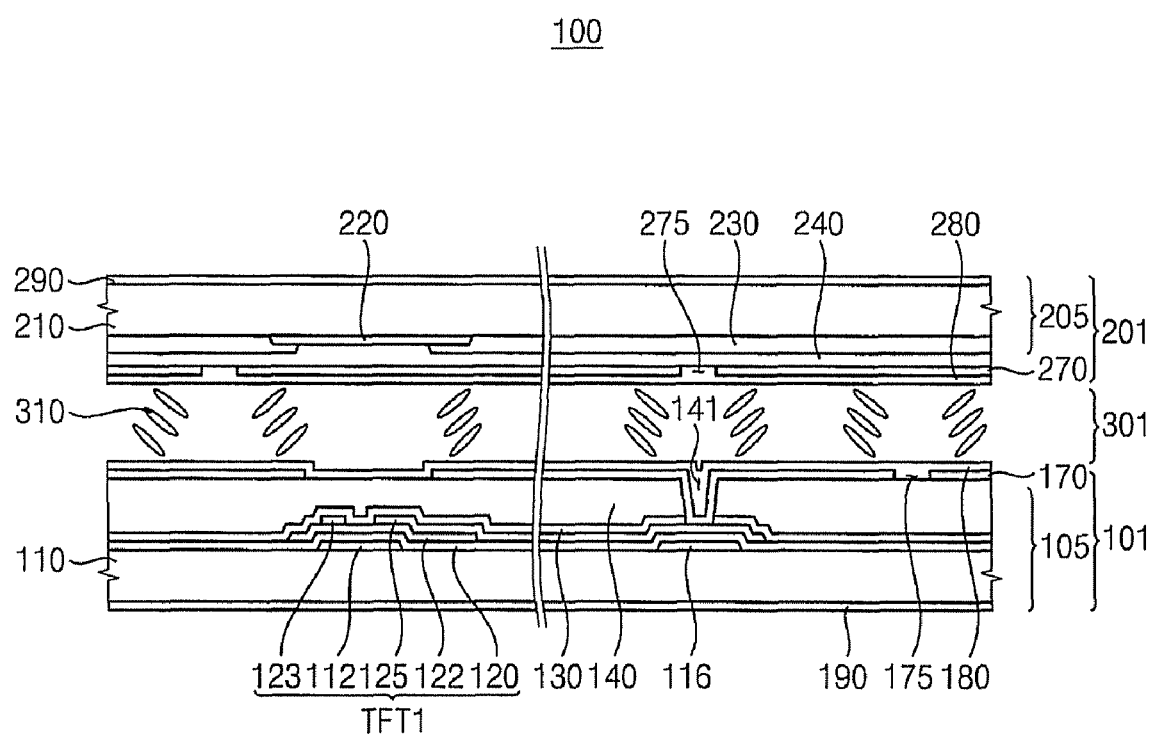
FIG. 3 is a cross-sectional view taken along line I-I' shown in FIG. 2.

FIG. 2 is a plan view illustrating an exemplary embodiment of pixel areas of the LCD device illustrated in FIG. 1. FIG. 3 is a cross-sectional view taken along line I-I' shown in FIG. 2.

Referring to FIGS. 1 to 3, the array substrate 101 includes a lower substrate 105 and a pixel electrode 170. The lower substrate 105 may include a lower base substrate 110, a plurality of a gate line 111, a plurality of a data line 121, a first storage line 116, a second storage line 118, a first thin-film transistor TFT1, and a second thin-film transistor TFT2.

Figure 4A:
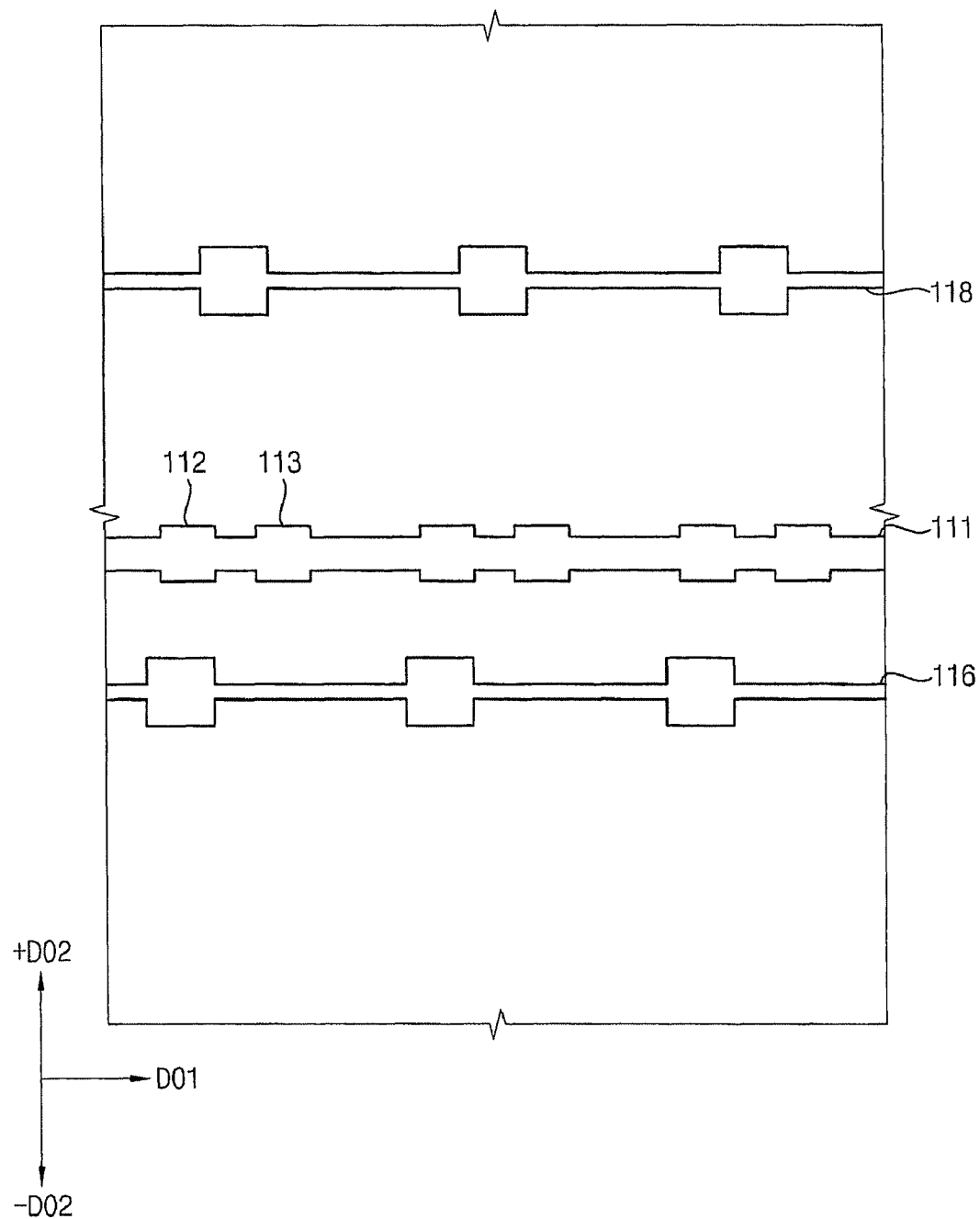
FIGS. 4A to 4C are plan views illustrating an exemplary embodiment of a method of manufacturing the array substrate illustrated in FIG. 2.
Figure 4B:
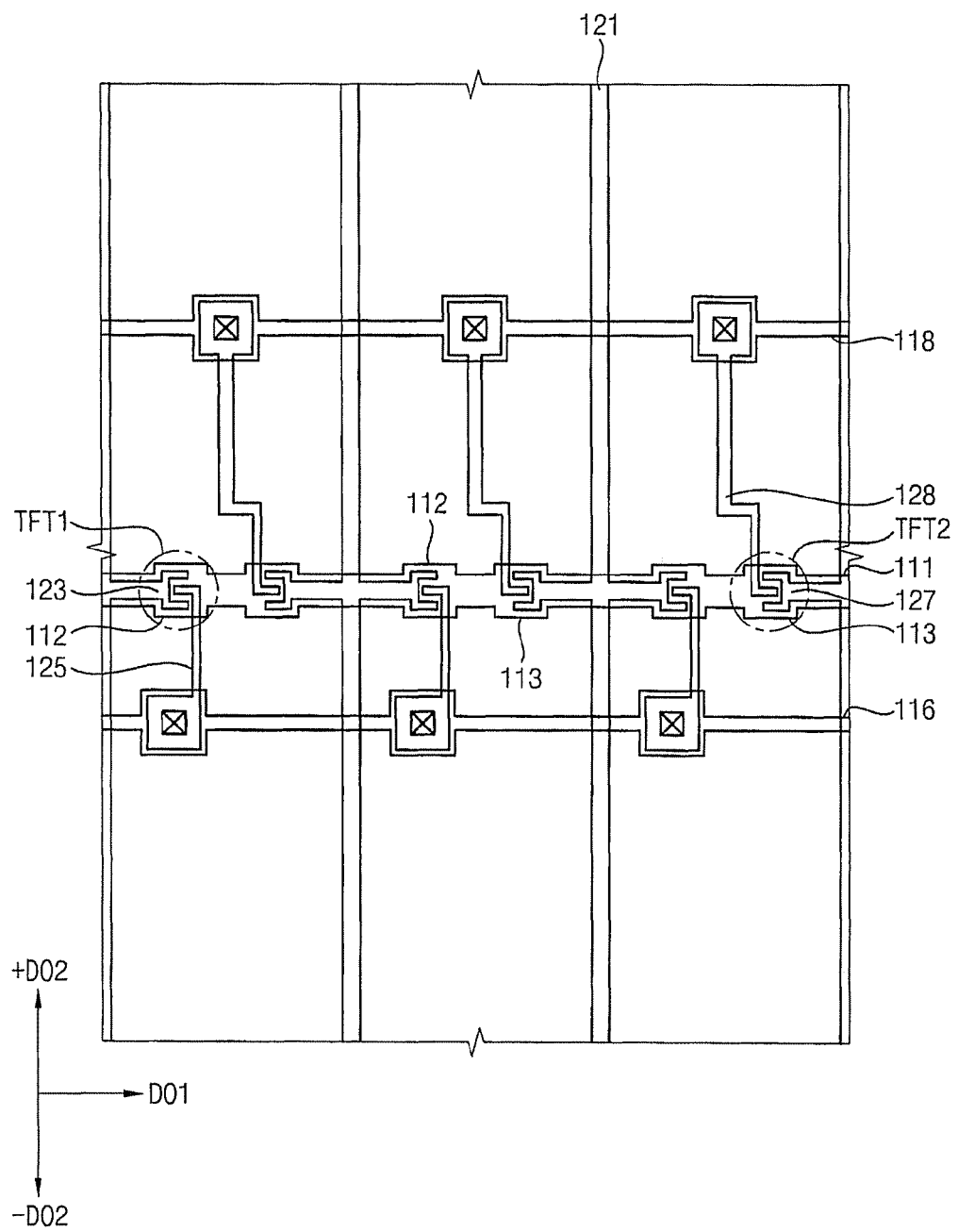
Figure 4C:
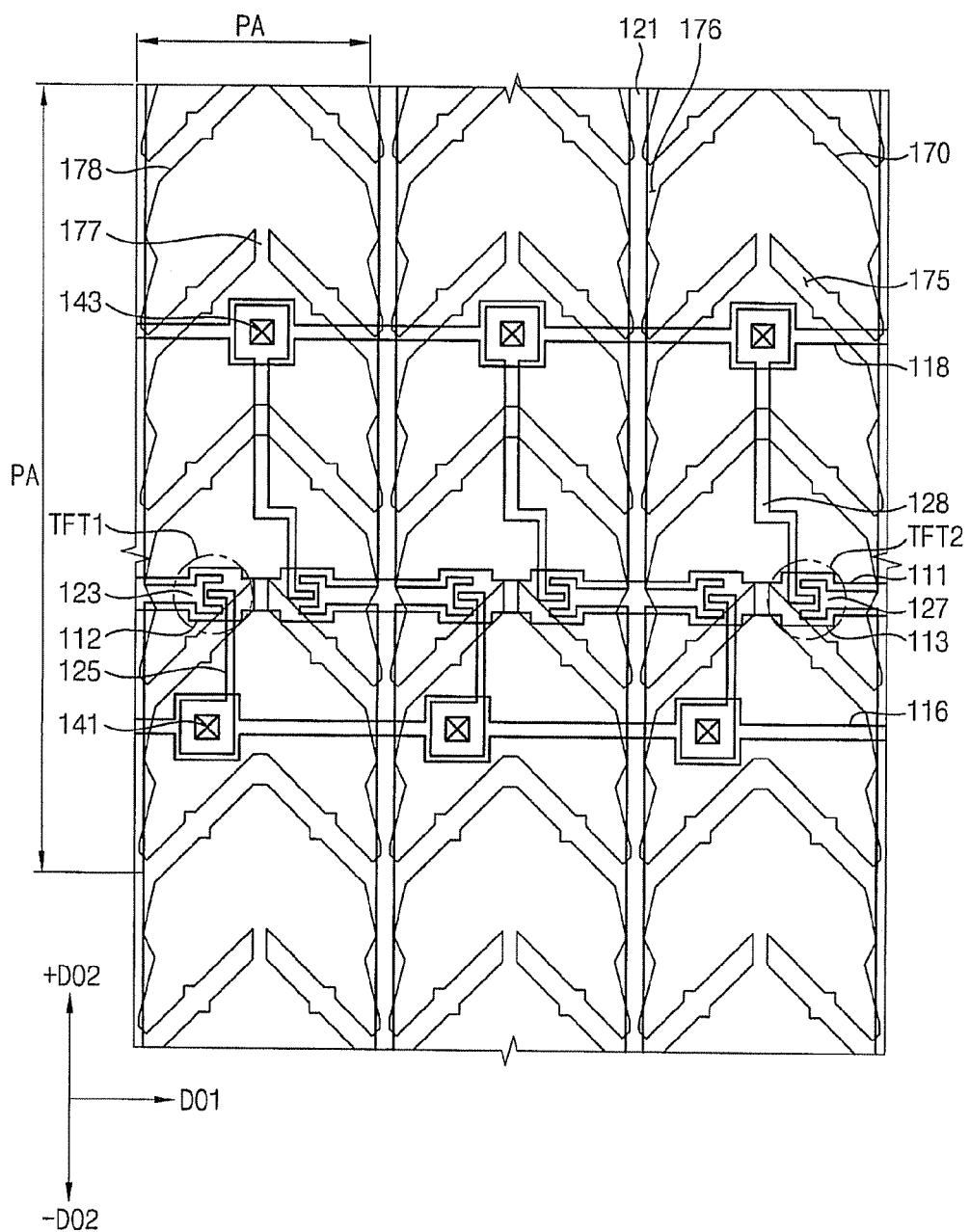

FIGS. 4A to 4C are plan views illustrating an exemplary embodiment of a method of manufacturing the array substrate illustrated in FIG. 2.

A plurality of pixel areas PA arranged substantially in a matrix shape is defined on the lower base substrate 110. The pixel area PA is defined as an independent area unit capable of independently controlling the liquid crystal. In an exemplary embodiment, the pixel areas PA may correspond to color filters of the opposing substrate 201, respectively.

In Embodiment 1 of the present invention, each of the pixel areas PA may have a substantially rectangular shape, which may have a length extending in the second direction D02. Alternatively, each of the pixel areas PA may have one of various shapes, such as a substantially zigzag shape.

The first thin-film transistor TFT1 may include a first gate electrode 112, a semiconductor pattern 122, a first source electrode 123, and a first drain electrode 125. The second thin-film transistor TFT2 may include a second gate electrode 113, the semiconductor pattern 122, a second source electrode 127, and a second drain electrode 128. The first and second thin-film transistors TFT1 and TFT2 may have substantially the same structure. Thus, the first thin-film transistor TFT1 will be mainly explained hereinafter, and any repetitive explanation concerning the second thin-film transistor TFT2 will be omitted.

The semiconductor pattern 122 may be electrically insulated from the first gate electrode 112, and disposed on the first gate electrode 112. The first source electrode 123 and the first drain electrode 125 may be disposed on the semiconductor pattern 122, and opposing each other with respect to the first gate electrode 112. The semiconductor pattern 122 may include an active layer and an ohmic contact layer on the active layer. The active layer may include amorphous silicon or polysilicon.

In order to manufacture the array substrate 101, a gate metal may be deposited on the lower base substrate 110, such as by a sputtering method, to form a gate metal layer. The gate metal layer may include a two-layer structure, such as including an aluminum layer and a molybdenum layer, or a three-layer structure, such as including a lower titanium layer, an aluminum layer and an upper titanium layer. In one exemplary embodiment, the gate metal layer may have a thickness of about 3,000 angstroms (Å). The lower base substrate 110 may include, but is not limited to, a glass material. As illustrated in FIG. 4A, the gate metal layer may be patterned, such as by a photoetching method, to form the gate line 111, the first and second gate electrodes 112 and 113 protruding from the gate line 111, and the first and second storage lines 116 and 118. The gate line 111 may extend longitudinally in the first direction D01 and pass through the pixel area PA. In an exemplary embodiment, the gate line 111 may overlap an entire of the pixel area PA.

As illustrated in FIG. 4A, since the first and second gate electrodes 112 and 113 may extend from a main portion of the gate line 111, the gate line 111 may be electrically connected to the first and second thin-film transistors TFT1 and TFT2.

The first and second storage lines 116 and 118 may be formed from the same layer as the gate line 111. In one exemplary embodiment, the first and second storage lines 116 and 118 may be disposed on an upper surface of the lower base substrate 110, and include the same material as the gate line 111. As illustrated in FIG. 4A, the first and second storage lines 116 and 118 may be substantially parallel with the gate line 111, and the gate line 111 may be disposed between the first and second storage lines 116 and 118 such as in a plan view of the array substrate.

As illustrated in FIGS. 2 and 4B, a gate insulation layer 120 and the semiconductor layer 122 are formed. The gate insulation layer 120 may be disposed on the gate lines 111. In one exemplary embodiment, the gate insulation layer 120 may be disposed on an entire of the lower base substrate 110. In one exemplary embodiment, the gate insulation layer 120 may include silicon nitride (SiNx), and may have a thickness of about 4,500 Å.

The semiconductor layer 122 may be disposed on the gate insulation layer 120. In one exemplary embodiment, an amorphous silicon (a-Si) layer having a thickness of about 2,000 Å, and an n+ ion doped amorphous silicon (n+ a-Si) layer having a thickness of about 500 Å may be sequentially disposed on the gate insulation layer 120, and then be etched to form the semiconductor pattern 122 on the first and second gate electrodes 112 and 113.

As illustrated in FIGS. 2 and 4C, a lower molybdenum layer, an aluminum layer and an upper molybdenum layer may be sequentially formed on the gate insulation layer 120 on which the semiconductor pattern 122 is disposed. In one exemplary embodiment, the lower molybdenum layer, the aluminum layer and the upper molybdenum layer may have thicknesses of about 300 Å, about 2,500 Å and about 1,000 Å, respectively. The lower molybdenum layer, the aluminum layer and the upper molybdenum layer may be patterned to form the data line 121, the first source electrode 123, the second source electrode 127, the first drain electrode 125, and the second drain electrode 128.

The data line 121 may be disposed on the gate insulation layer 120 and extend longitudinally in the second direction D02. The first source electrode 123 and the second source electrode 127 each respectively protrude from portions of data lines 121, at areas adjacent to positions of the data lines 121 crossing the gate line 111. The first source electrode 123 and the second source electrode 127 are disposed on the semiconductor pattern 122. As illustrated in FIGS. 2 and 4C, a pair of adjacent source electrodes including the first source electrode 123 and the second source electrode 127, may extend from a main portion of a single data line 121, and protrude in opposite directions relative to the single data line 121.

The first drain electrode 125 may be disposed opposing the first source electrode 123 on the semiconductor pattern 122 with respect to the first gate electrode 112. The first drain electrode 125 may extend so that a portion of the first drain electrode 125 may be in the pixel area PA of the lower substrate 105.

The gate line 111 may extend longitudinally in the first direction D01 to pass through, and completely overlap with, the pixel area PA. The data line 121 may be disposed between adjacent pixel areas PA, may not overlap either of the adjacent pixel areas PA, and may extend longitudinally in the second direction D02.

A first end portion of the first drain electrode 125 may be adjacent to the first source electrode 123 and a second end portion of the first drain electrode 125 may partially overlap with the first storage line 116. As illustrated in FIGS. 2 and 4C, a first distal end of the first drain electrode 125 overlaps the gate line 111, a second distal end of the first drain electrode 125 overlaps the first storage line 116 and a connecting portion disposed between the first and second distal ends of the first drain electrode 125 may be disposed in the pixel area PA without overlapping the gate line 111 or the first storage line 116. The first drain electrode 125 is a single and continuous member.

A first end portion of the second drain electrode 128 may be adjacent to the second source electrode 127 and a second end portion of the second drain electrode 128 may partially overlap with the second storage line 118. As illustrated in FIGS. 2 and 4C, a first distal end of the second drain electrode 128 overlaps the gate line 111, a second distal end of the second drain electrode 128 overlaps the second storage line 118 and a connecting portion disposed between the first and second distal ends of the second drain electrode 128 may be disposed in the pixel area PA without overlapping the gate line 111 or the second storage line 118. The second drain electrode 128 is a single and continuous member.

Referring again to FIG. 3, a passivation layer 130 may be disposed on the lower substrate 105 including the data line 121. In one exemplary embodiment, the passivation layer 130 may include silicon nitride (SiNx) and may have a thickness of about 2,000 Å.

As illustrated in FIG. 3, an organic insulation layer 140 may be disposed on the passivation layer 130. In one exemplary embodiment, the organic insulation layer 140 may have a thickness of about 2.0 micrometers ($\mu$m). The organic insulation layer 140 and the passivation layer 130 may include a first contact hole 141 and a second contact hole 143 disposed therethrough. The first and second contact holes 141 and 143 may partially expose the first and second drain electrodes 125 and 128, respectively. The organic insulation layer 140 may reduce parasitic capacitance between the pixel electrode 170 and the data line 121. In an alternative embodiment, when the pixel electrode 170 does not overlap with the data line 121, the organic insulation layer 140 may be omitted.

Referring again to FIG. 1, the LCD device 100 may further include a driver. The driver may include a data driver 10 providing the data line 121 with a data signal, and a gate driver 30 providing the gate line 111 with a gate signal.

As illustrated in FIG. 1, the data driver 10 may be mounted on an upper portion of a peripheral area 61 of the lower base substrate 110 which is not covered by the opposing substrate 201 as a data driver IC form. In a plan view, the gate driver 30 may be mounted on a left portion of a peripheral area 61 of the lower base substrate 110, such as a gate driver IC form. Alternatively, the data driver 10 and the gate driver 30 may be mounted on the peripheral 61 of the lower base substrate 110 as a single chip form.

A flexible printed circuit ("FPC") 20 may be electrically connected to an upper edge portion of the peripheral area 61 of the lower base substrate 110, in the plan view.

Input terminals of the data driver IC 10 and the gate driver IC 30 may be electrically connected to the FPC 20 through external connection lines 35.

Output terminal of the gate driver IC 30 may be electrically connected to the gate line 111, the first storage line 116 and the second storage line 118.

Referring again to FIG. 4C, a transparent conductive material, such as indium tin oxide ("ITO") or indium zinc oxide ("IZO"), is deposited on the organic insulation layer 140 to form a transparent conductive layer. The transparent conductive layer may have a thickness of about 900 Å. The transparent conductive layer is patterned to form the pixel electrodes 170 in the pixel area PA.

In one exemplary embodiment, a portion of the transparent conductive layer may be removed to form a first slit part 175 and a second slit part 176. A portion of the transparent conductive layer may be removed to form the first slit part 175 which may extend in a substantially zigzag shape along the first direction D01, in the plan view. A plurality of first slit parts 175 may be arranged in the second direction D02. Another portion of the transparent conductive layer may be removed to form the second slit part 176, which may extend longitudinally in the second direction D02, and may pass through bent portions of the first slit parts 175. The second slit part 176 may be disposed corresponding to and overlapping with the data line 121.

The pixel electrode 170 may be defined by a remaining portion of the transparent conductive layer except for the first and second slit parts 175 and 176. In one exemplary embodiment, the transparent conductive is patterned to form the first and second slit parts 175 and 176, and the patterned transparent conductive layer may form the pixel electrode 170. The first and second slit parts 175 and 176 will be described in detail.

The pixel electrode 170 may be divided into a plurality of unit pixel electrode patterns arranged in the second direction D02 by the first and second slit parts 175 and 176. Each of the unit pixel electrode patterns of the pixel electrode 170 may have a substantially inverted V-shape. First parts of the unit pixel electrode patterns may be electrically connected to each other by a connection part 177 to form a first sub-pixel electrode. The connection part 177 may electrically connect center portions of adjacent unit pixel electrode patterns. Second parts of the unit pixel electrode patterns may be electrically connected to each other by another connection part 177 to form a second sub-pixel electrode. Where adjacent unit pixel electrode patterns are not electrically connected to each other, the first slit part 175 is continuously disposed.

The first sub-pixel electrode may be electrically connected to the first drain electrode 125 through the first contact hole 141. The second sub-pixel electrode may be electrically connected to the second drain electrode 128 through the second contact hole 143.

As illustrated in Embodiment 1 of the present invention, four unit pixel electrode patterns may be disposed in one pixel area PA. The four unit pixel electrode patterns may be arranged in the second direction D02. As illustrated in FIG. 4C, the lower two of the four unit pixel electrode patterns may be electrically connected to each other to form the first sub-pixel electrode, and the upper two of the four unit pixel electrode patterns may be electrically connected to each other to form the second sub-pixel electrode. The first sub-pixel electrode may be electrically connected to the first drain electrode 125 of the first thin-film transistor TFT1 to receive a first pixel voltage from the first thin-film transistor TFT1, and the second sub-pixel electrode may be electrically connected to the second drain electrode 128 of the second thin-film transistor TFT2 to receive a second pixel voltage from the second thin-film transistor TFT2. In an exemplary embodiment, the first pixel voltage may have a relatively low level and the second pixel voltage may have a relatively high level. The number and the shape of the unit pixel electrode patterns disposed in each pixel area PA may be variously changed by the shapes of the first and second slit parts 175 and 176.

Figure 5:
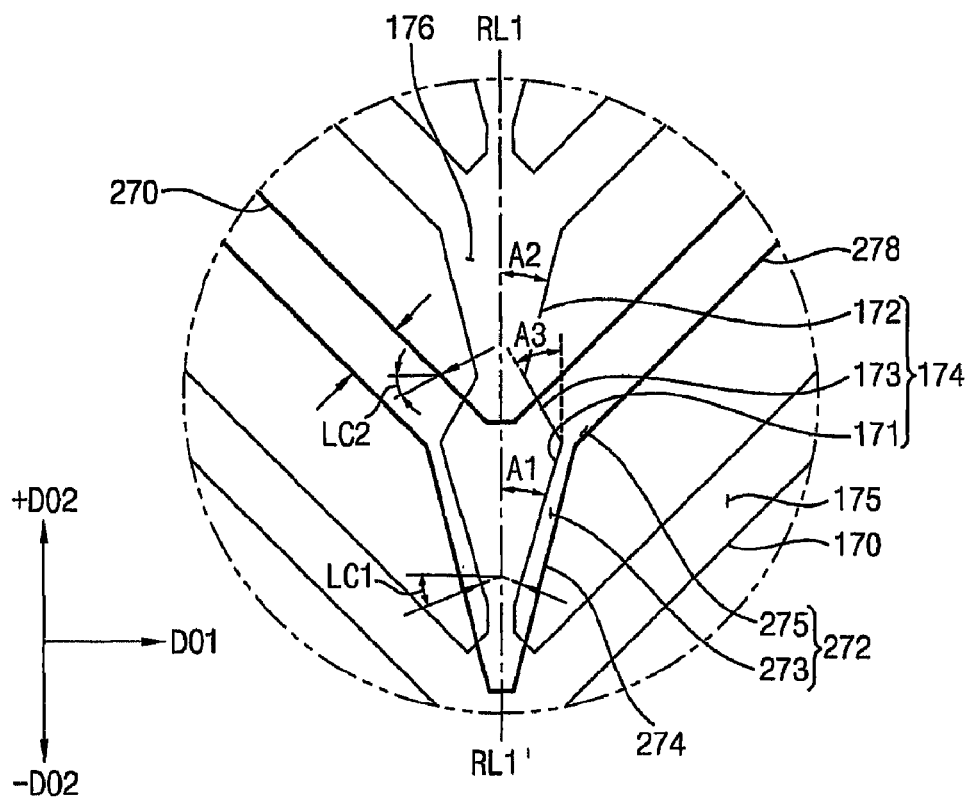
FIG. 5 is an enlarged plan view illustrating an exemplary embodiment of a portion of the pixel areas illustrated in FIG. 2.

FIG. 5 is an enlarged plan view illustrating an exemplary embodiment of a portion of the pixel areas illustrated in FIG. 2.

Referring to FIGS. 2, 3 and 5, in each pixel area PA, the first slit parts 175 may have a substantially inverted V-shape and may be arranged in the second direction D02. Referring to Embodiment 1 of the present invention, a bent portion of the first slit part 175 which crosses (e.g., overlaps) the data line 121 will be referred to as a first bent portion, and another bent portion of the first slit part 175 between adjacent first bent portions will be referred to as a second bent portion. The first slit part 175 includes two third edges 178 opposite to each other. The connection part 177 connects the two third edges 178 at the second bent portion of the first slit part 175.

Substantially straight portions of the first slit part 175 may longitudinally extend along directions of about 45° or about 135° with respect to a polarization axis of a lower polarizing plate 190 which will be described later.

The second slit part 176 extends longitudinally in the second direction D02. The second slit parts 176 may pass through the first bent portions of the first slit parts 175 (which overlap the data line 121) arranged in the second direction D02. The second slit part 176 may be disposed substantially corresponding to the data line 121, in position and/or dimension. The second slit part 176 includes two first edges 174 opposite to each other. Each of the first edges 174 may extend in a substantially zigzag shape along the second direction D02, to form angles with respect to the positive second direction +D02. The second slit part 176 may be substantially symmetrical with respect to a reference line RL1-RL1' which is substantially parallel to the second direction D02.

In first and second pixel areas PA which are adjacent to each other along the first direction D01, a first pixel electrode in the first pixel area PA may be substantially symmetrical to a second pixel electrode in the second pixel area PA with respect to the reference line RL1-RL1'. In one exemplary embodiment, the pixel electrodes in the first and second pixel areas PA may have substantially the same shape. Where the pixel areas PA are arranged substantially in a matrix shape, the unit pixel electrode patterns may be arranged to form a substantially zigzag shape along the first direction D01.

The gate line 111, the first storage line 116 and the second storage line 118 extend in the first direction D01 to pass through (e.g. overlap) and entire of the pixel area PA. The data line 121 between adjacent pixel areas PA may extend in the second direction D02 to correspond to and overlap with the second slit part 176.

The arrangement of directors of liquid crystal molecules may be affected by the shape of the pixel electrode 170, such as an extension direction of an edge of the pixel electrode 170. When the directors of the liquid crystal molecules may be arranged in a direction of about 45° with respect to the polarization axis of the lower polarizing plate 190, the display quality may be improved. Thus, the edge of the pixel electrode 170 may be disposed such that the directors of the liquid crystal molecules may be arranged in the direction of about 45° with respect to the polarization axis of the lower polarizing plate 190.

As illustrated in FIG. 5, in Embodiment 1 of the present invention, the first edges 174 of the second slit part 176, which are substantially symmetrical to each other with respect to the reference line RL1-RL1', may be inclined at various angles with respect to the reference line RL1-RL1'. When compared to the edges of the second slit part substantially parallel to the reference line RL1-RL1', the directors of the liquid crystal molecules may be preferably arranged in the direction of about 45° with respect to the polarization axis of the lower polarizing plate 190 by the second slit part 176 including the first edges 174 inclined at the various angles with respect to the reference line RL1-RL1'.

In Embodiment 1 of the present invention, each first edge 174 may include a first side 171, a second side 172 and a third side 173. The first side 171 and the second side 172 may be respectively inclined at a first angle A1 and a second angle A2 in a clockwise rotation with respect to the positive second direction +D02. The third side 173 may be inclined at a third angle A3 in a counterclockwise rotation with respect to the positive second direction +D02. The third side 173 connects the first side 171 with the second side 172. In the illustrated embodiment of FIG. 5, a width taken in the first direction D01 between the first sides 171 opposing each other relative to the reference line RL1-RL1', may decrease in the negative second direction −D02. A width taken in the first direction D01 between the second sides 172 opposing each other relative to the reference line RL1-RL1' may increase toward the positive second direction +D02. Alternatively, the first edges 174 of the second slit part 176 may have various shapes.

In the exemplary embodiments, the first and second angles A1 and A2 may be in a range of about 1° to about 30°. In one exemplary embodiment, the first and second angles A1 and A2 may be in a range of about 4° to about 20°.

Referring again to FIG. 3, a lower alignment layer 180 may be disposed to cover the pixel electrode 170, and may overlap an entire of the lower base substrate 110.

The lower alignment layer 180 may substantially perpendicularly align the directors of the liquid crystal molecules 310 in a liquid crystal layer 301 with respect to the array substrate 201. In one exemplary embodiment, the lower alignment layer 180 may affect an initial arrangement of the directors of the liquid crystal molecules in the liquid crystal layer 301.

The array substrate 101 may further include the lower polarizing plate 190. The lower polarizing plate 190 may have a lower polarization axis. The straight portions of the first slit part 175 of the pixel electrode 170 may be inclined at about 45° or about 135° with respect to the lower polarization axis of the lower polarizing plate 190. As illustrated in FIG. 3, the lower polarizing plate 190 may be disposed on a rear surface of the array substrate 101. The polarizing plates 190 and 290 may be the frontmost and the rearmost element of the LCD device 100, but the present invention is not limited thereto.

Referring again to FIGS. 1 and 3, the opposing substrate 201 includes an upper substrate 205 and a common electrode 270. The upper substrate 205 may include an upper base substrate 210, a light-blocking pattern 220, a color filter pattern 230, and an overcoating layer 240.

The light-blocking pattern 220 may be disposed on the lower base substrate 210 and may correspond to and overlap with the gate line 111, the data line 121 and the first and second thin-film transistors TFT1 and TFT2.

The color filter pattern 230 is disposed on a region of the upper base substrate 210 corresponding to the pixel areas PA. In one exemplary embodiment, the color filter pattern 230 may include a red color filter, a green color filter and a blue color filter. Each of the red, green and blue color filters may correspond to one pixel area PA.

The overcoating layer 240 covers (e.g., overlaps) the color filter pattern 230 and the light-blocking pattern 220. The overcoating layer 240 may be disposed overlapping an entire of the uppers substrate 205. The common electrode 270 is disposed on the overcoating layer 240. As illustrated in FIG. 5, a third slit part 272 may be disposed in the common electrode 270. The third slit part 272 may be formed by partially removing a conductive layer for the common electrode 270 in a substantially zigzag shape. The third slit part 272 may include a domain dividing slit 275 and a boundary slit 273. The boundary slit 273 may be longitudinally extended in the second direction D02, and overlap the second slit part 176 of the pixel electrode 170.

The domain dividing slit 275 may be formed by partially removing the conductive layer for the common electrode 270 in the substantially zigzag shape along the first direction D01 and may include fourth edges 278 which are opposing each other with respect to the area where the conductive layer is removed. The domain dividing slit 275 may be disposed between adjacent first slit parts 175 in the plan view. In a region of the upper base substrate 210 corresponding to each pixel area PA, each domain dividing slit 275 may have a substantially inverted V-shape. Each pixel area PA may be divided into a plurality of domains by the first slit part 175 and the domain dividing slit 275.

Each of the third edges 178 of the first slit part 175 may include a depressed notch and each of the fourth edges 278 of the domain dividing slit 275 may include a raised notch. Alternatively, each of the third edges 178 of the first slit part 175 may include the raised notch and each of the fourth edges 278 of the domain dividing slit 275 may include the depressed notch. The term "depressed notch" is used to describe a recess that extends inwardly from the edge into the electrode, where a "raised notch" is used to describe a protrusion that extends outwards from the edge into the slit. When an electric field between the pixel electrode 170 and the common electrode 270 is applied to the liquid crystal layer 301, a singular point may be generated adjacent to the depressed notch or the raised notch.

The arrangement of the liquid crystal molecules at the singular point may be considerably different from that in other regions adjacent to the singular point, and may not have a predetermined directionality. The electric field may be considerably weak or considerably strong at the singular point. A positive singular point at which the directors of the liquid crystal molecules are convergent may be generated in a region to which the considerably strong electric field is applied. A negative singular point at which the directors of the liquid crystal molecules are divergent may be generated in a region to which the considerably weak electric field is applied. The positive singular point and the negative singular point may be alternately generated.

The liquid crystal may not serve as a light shutter at the singular point. When the singular points are irregularly generated, the LCD device 100 may display an incidental image or a stained image. The notches in the edges of the electrodes may regularly generate the singular points in the domains of the liquid crystal layer 301. Thus, the notches may reduce or effectively prevent the LCD device 100 from displaying the incidental image or the stained image.

The boundary slit 273 is formed by partially removing the conductive layer for the common electrode 270. The boundary slit 273 may extend from a bent portion of the domain dividing slit 275 toward the negative second direction −D02. The boundary slit 273 may extend to the first bent portion of the first slit part 175, and may overlap a portion of the first bent portion of the first slit part 175. The boundary slit 273 may include second edges 274 opposing each other relative to an area of the boundary slit 273 where the conductive layer of the common electrode 270 is absent, which are substantially symmetrical to each other with respect to the reference line RL1-RL1'. In Embodiment 1 of the present invention, a width taken in the first direction D01 between the second edges 274 of the common electrode 270 may be greater than a width between the first sides 174 of the second slit part 176 of the pixel electrode 170. The domain dividing slit 275 and the boundary slit 273 may be connected to each other to form a substantially Y-shape in the plan view.

The width between the second edges 274 may decrease from the domain dividing slit 275 toward the negative second direction −D02. Each of the second edges 274 may be inclined at the first angle A1 with respect to the positive second direction +D02 so that each of the second edges 274 of the common electrode 270 may be substantially parallel to the corresponding first side 171 of the pixel electrode 170. Since the width between the second edges 274 may be greater than the width between the first sides 171, the first side 171 may be disposed between the reference line RL1-RL1' and the corresponding second edge 274, in the plan view.

The opposing substrate 201 may further include an upper alignment layer 280 and an upper polarizing plate 290. The upper alignment layer 280 may be disposed on the common electrode 270 and a whole of the upper base substrate 210, and may substantially perpendicularly align the directors of the liquid crystal molecules in the liquid crystal layer 301. The upper polarizing plate 290 may be disposed on an upper surface of the upper base substrate 210, to define an uppermost layer of the LCD device 100. The upper polarizing plate 290 may have an upper polarization axis that is substantially perpendicular to the lower polarization axis of the lower polarizing plate 190.

When the data line 121 and the gate line 111 respectively receive the data signal and the gate signal from the driver, the first and second thin-film transistors TFT1 and TFT2 are turned on. When the first and second thin-film transistors TFT1 and TFT2 are turned on, the data signal may be applied to the pixel electrode 170 as a pixel voltage.

Figure 6:
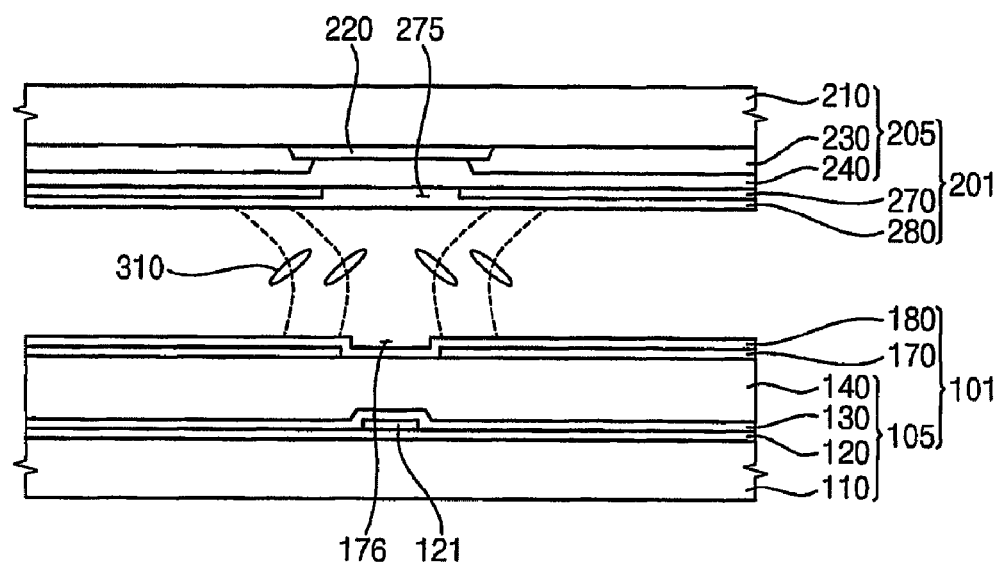
FIG. 6 is a cross-sectional view taken along line II-II' shown in FIG. 2.
Figure 7:
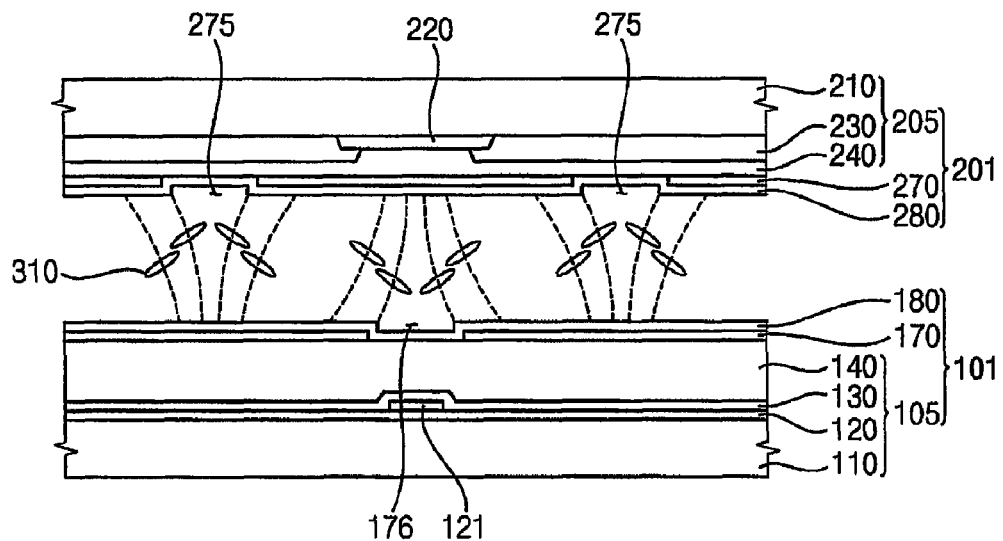
FIG. 7 is a cross-sectional view taken along line III-III' shown in FIG. 2.

FIG. 6 is a cross-sectional view taken along line II-II' shown in FIG. 2. FIG. 7 is a cross-sectional view taken along line III-III' shown in FIG. 2.

Referring to FIGS. 2, 5 and 6, as described above, the width between the first sides 171 may be smaller than the width between the second edges 274, at all portions of the first sides 171. As illustrated in FIG. 5, the directors of the liquid crystal molecules may be inclined toward the reference line RL1-RL1' passing through a central portion of the boundary slit 273. In addition, as illustrated in FIG. 5, the directors of the liquid crystal molecules between the first side 171 and the second edge 274 may be inclined at a first director angle LC1, which may be in a range of about 5° to about 20° with respect to the first direction D01. Since the lower polarization axis of the lower polarizing plate 190 may be substantially parallel to the first direction D01 or the second direction D02, the directors of the liquid crystal molecules between the first side 171 and the second edge 274 may inclined at an angle which may be in a range of about 5° to about 20° with respect to the lower polarization axis of the lower polarizing plate 190.

Referring to FIGS. 2, 5 and 7, the directors of the liquid crystal molecules between the fourth edge 278 of the domain dividing slit 275 and the second side 172 of the first edge 174 may be inclined at a second director angle LC2 with respect to the first direction D01 by the second side 172 of the first edge 174. Thus, in the region between the first edges 174, the light transmissivity and response time may be improved.

Figure 8:
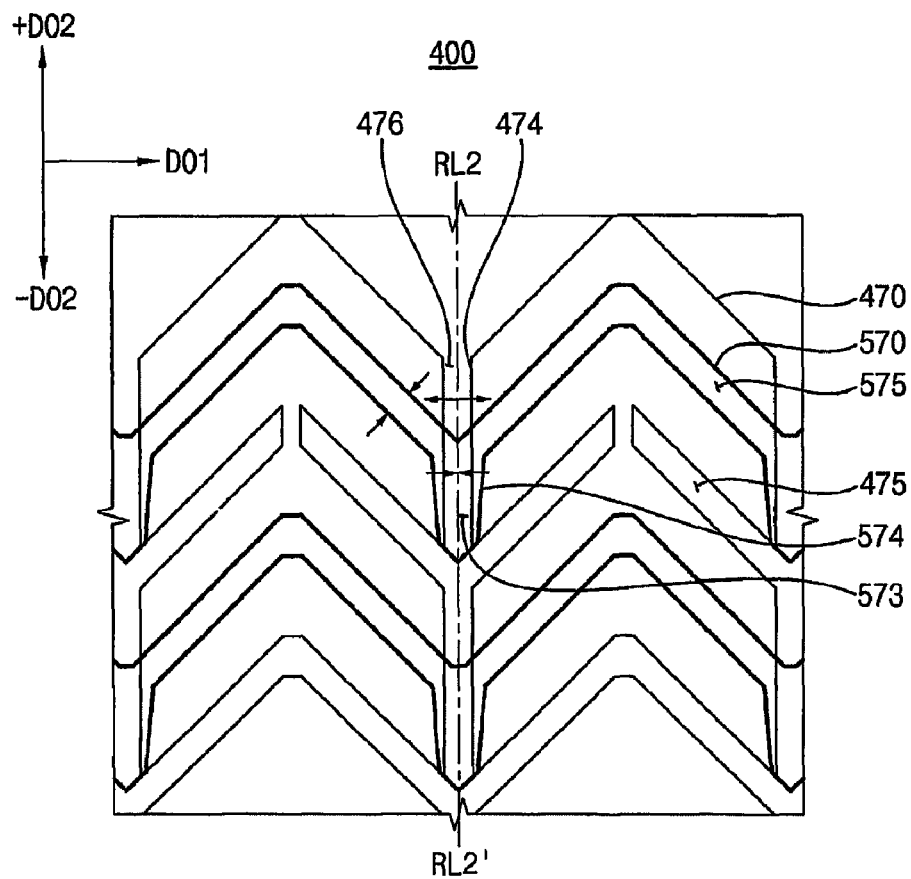
FIG. 8 is a partial plan view illustrating an alternative exemplary embodiment of an LCD device including a pixel electrode which includes an edge portion substantially parallel with the second direction.

FIG. 8 is a partial plan view illustrating an exemplary embodiment of an LCD device including a pixel electrode which includes an edge portion substantially parallel with the second direction.

Referring to FIG. 8, an LCD device 400 illustrated in FIG. 8 may include components which are substantially the same as those of the LCD device illustrated in FIGS. 1 to 7, except that the first edges 474 of the pixel electrode 470 are substantially parallel to the second direction D02. A second slit part 476 of the pixel electrode 470 may extend longitudinally in the second direction D02, and may pass through bent portions of first slit parts 475 of the pixel electrode 470. The second slit part 476 of the pixel electrode 476 may be substantially symmetrical with respect to a reference line RL2-RL2' which is substantially parallel to the second direction D02. The common electrode 570 may include a domain dividing slit 575 and a boundary slit 573

The width taken in the first direction between second edges 574 of the common electrode 570 of the LCD device 400 may be greater than a width between the first edges 474 of the pixel electrode 470 at all portions of the first edges 474. The width of the second edges 574, or of a boundary slit 573, of the common electrode 570 may decrease toward the negative second direction −D02, in the plan view. Thus, the directors of the liquid crystal molecules between the first edge 474 of the pixel electrode 470 and the second edge 574 of the common electrode 570 may be substantially parallel to the polarization axis of the lower polarizing plate or the upper polarizing plate. Therefore, the directors of the liquid crystal molecules on the second slit part 476 of the pixel electrode 470 may not be arranged to be inclined at about 45° or about 135° with respect to the polarization axis of the upper polarizing plate or the lower polarizing plate, so that the display quality of the LCD device 400 may be lower than that of the LCD device 100.

Figure 9:
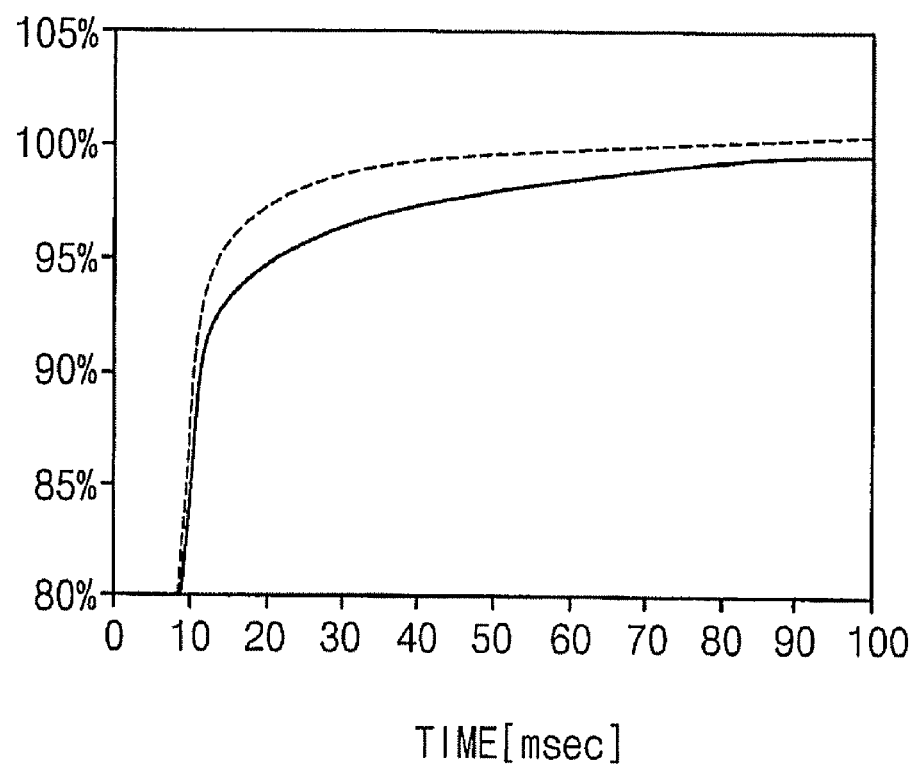
FIG. 9 is a graph illustrating an exemplary embodiment of light transmissivity of the LCD device according to Embodiment 1 of the present invention and the LCD device illustrated in FIG. 8 with respect to an amount of time during which power is applied.

FIG. 9 is a graph illustrating an exemplary embodiment of light transmissivity of the LCD device according to Embodiment 1 of the present invention and the LCD device illustrated in FIG. 8 with respect to an amount of time during which power is applied.

In FIG. 9, a lateral axis indicates an amount of time during which the power is applied, and a vertical axis indicates the light transmissivity of the LCD device 100 and 400. In FIG. 9, the dotted line illustrates the light transmissivity of the LCD 100 in accordance with Embodiment 1 of the present invention and the solid line illustrates the light transmissivity of the LCD 400 illustrated in FIG. 8.

Referring to FIG. 9, the transmissivity of the LCD device 100 is greater than that of the LCD device after about 10 milliseconds (msec). An amount of time for reaching maximum light transmissivity of the LCD device 100 is in a range of about 70 msec to about 80 msec, and an amount of time for reaching maximum light transmissivity of the LCD device 400 is in a range of about 300 msec to about 500 ms. In addition, the LCD device 100 and the LCD device 400 have substantially the same or similar light transmissivity after about 500 ms. That is, the LCD device 100 may have improved light transmissivity and response time compared to those of the LCD device 400. Therefore, the LCD device in accordance with Embodiment 1 of the present invention may have the improved light transmissivity and the improved response time because the first edges 174 of the second slit part 176 of the pixel electrode 170, and the second edges 274 of the boundary slit 273 of the common electrode 270 are inclined with respect to the second direction D02.

Embodiment 2

Figure 10:
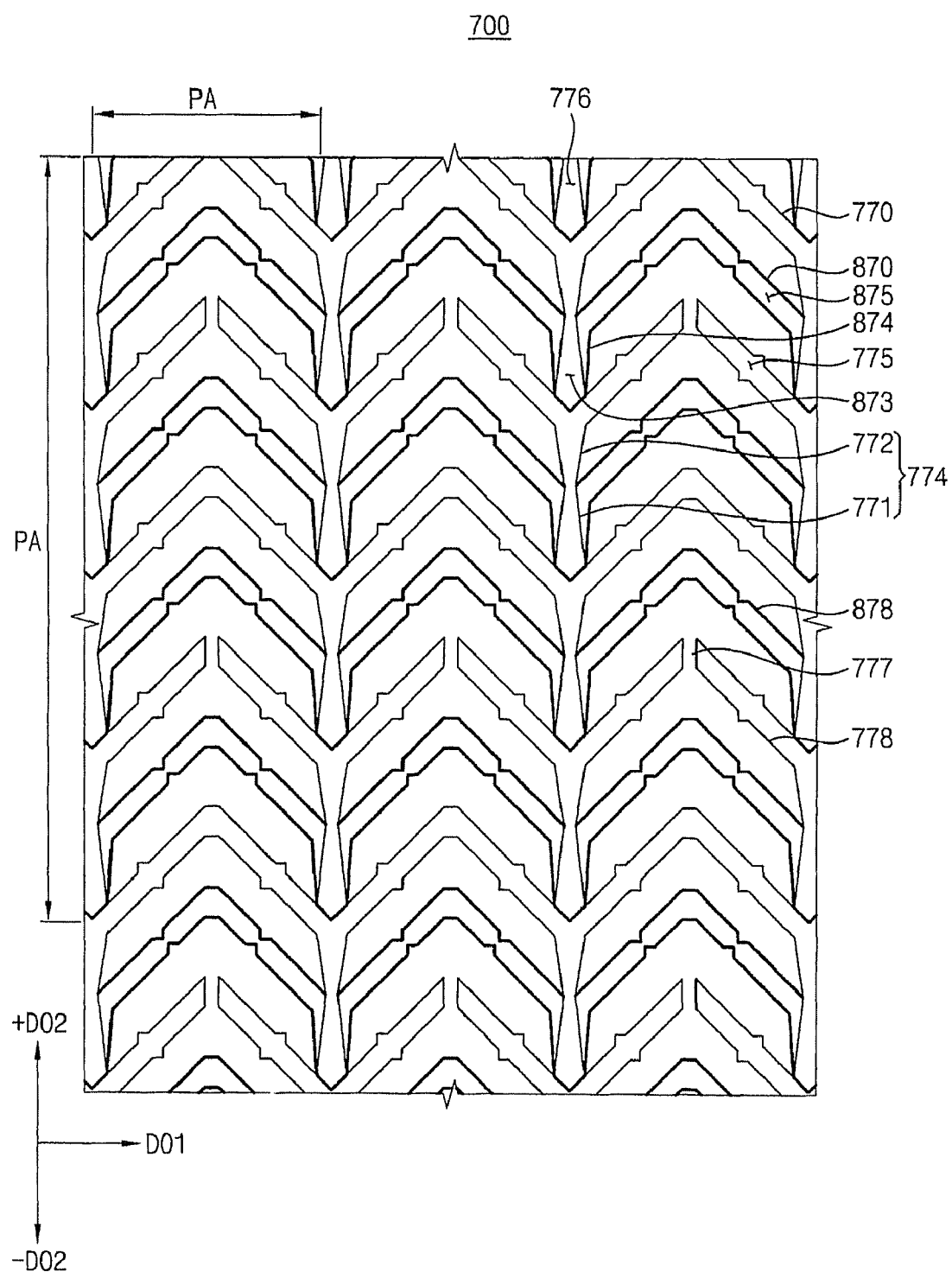
FIG. 10 is a plan view illustrating pixel areas of an LCD device in accordance with Embodiment 2 of the present invention.
Figure 11:
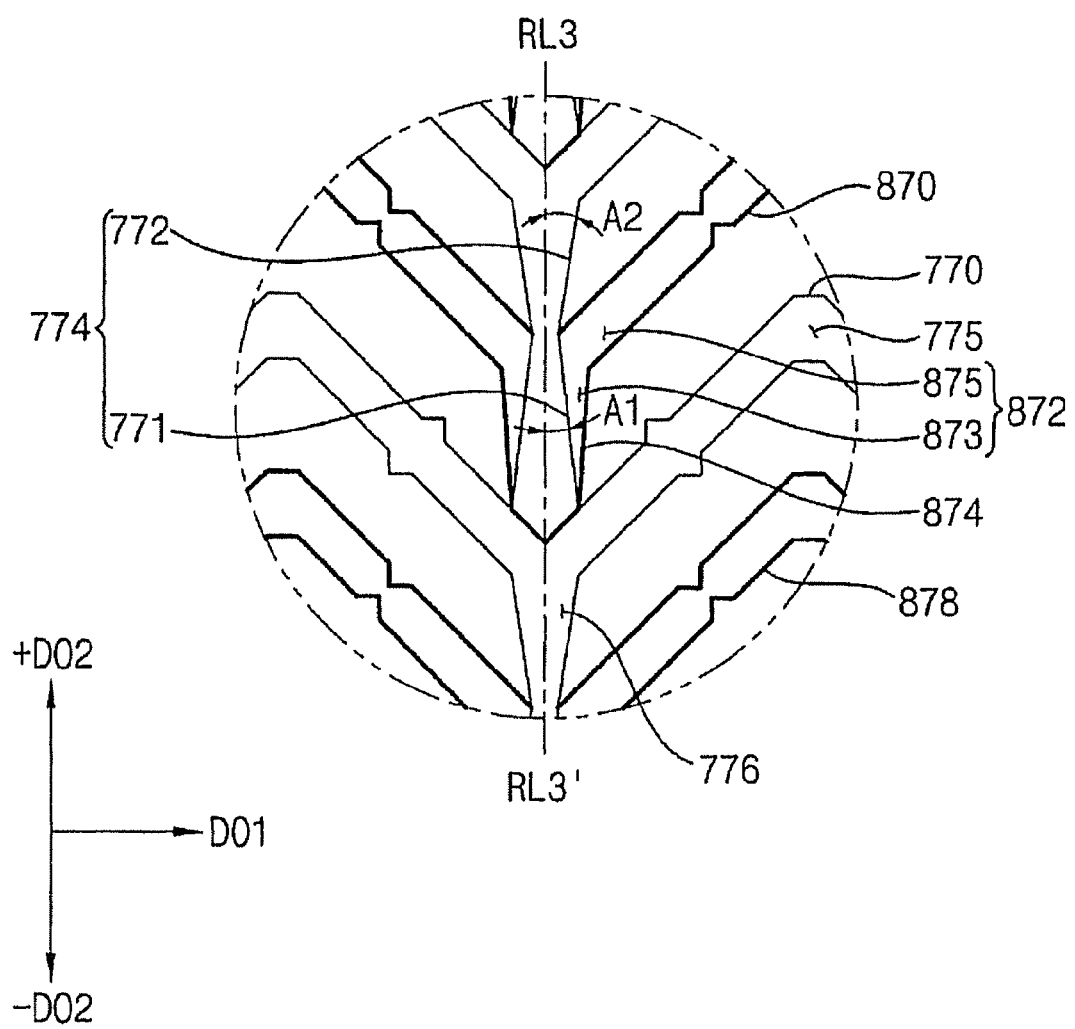
FIG. 11 is an enlarged plan view illustrating an exemplary embodiment of a portion of the pixel areas illustrated in FIG. 10.

FIG. 10 is a plan view illustrating pixel areas of an LCD device in accordance with Embodiment 2 of the present invention. FIG. 11 is an enlarged plan view illustrating an exemplary embodiment a portion of the pixel areas illustrated in FIG. 10.

Referring to FIGS. 10 and 11, an LCD device 700 includes components which are substantially the same as or similar to those of the LCD device 100 illustrated in FIGS. 1 to 7, except for the shape of a first edge 774 of a second slit part 776. Thus, the same or similar components will be referred to using the same reference numeral and any repetitive explanation will be omitted.

A pixel electrode 770 may be defined by a remaining portion of a transparent conductive layer except for first slit part 775 and second slit part 776. The pixel electrode 770 may be divided into a plurality of unit pixel electrode patterns arranged in the second direction D02 by the first and second slit parts 775 and 776. The unit pixel electrode patterns may be electrically connected to each other by a connection part 777 to form a sub-pixel electrode. The first slit part 775 includes two third edges 778 opposing each other with respect to an area of the first slit part 775. The connection part 777 connects the two third edges 778 at a second bent portion of the first slit part 775.

A common electrode 870 may include a third slit part 872, which includes a domain dividing slit 875 and a boundary slit 873. The boundary slit 873 may be longitudinally extended in the second direction D02, and overlap the second slit part 776 of the pixel electrode 770. The domain dividing slit 875 may include fourth edges 878 which are opposing each other and may be disposed between adjacent first slit parts 775 in the plan view.

In Embodiment 2 of the present invention, each of the first edges 774 may include a first side 771 and a second side 772. The first side 771 of the first edge 774 of the pixel electrode 770 may be inclined at a first angle A1 with respect to the positive second direction +D02, and may be disposed between the reference line RL3-RL3' and the second edge 874 of the common electrode 870, in the first direction of the plan view. The second side 772 of the first edge 774 of the pixel electrode 770 may be inclined at a second angle A2 with respect to the positive second direction +D02 and may be connected to the first side 771 of the pixel electrode 770. A width taken in the first direction between the first sides 771 may increase toward the negative second direction −D02, and a width between the second sides 772 may increase toward the positive second direction +D02. The first angle A1 and the second angle A2 may be in a range of about 1° to about 30°. In one exemplary embodiment, the first angle A1 and the second angle A2 may be in a range of about 5° to about 20°.

In Embodiment 2 of the present invention illustrated in FIGS. 10 and 11, the first side 771 and the second side 772 of the first edge 774 of the pixel electrode 770 may have a longitudinal length that is greater than a longitudinal length of the first side 171 and the second side 172 of the LCD device 100 illustrated in FIGS. 1 to 7. Therefore, the LCD device 700 in accordance with Embodiment 2 of the present invention may have improved light transmissivity and response time compared to those of the LCD device 100 in accordance with Embodiment 1 of the present invention.

Embodiment 3

Figure 12:
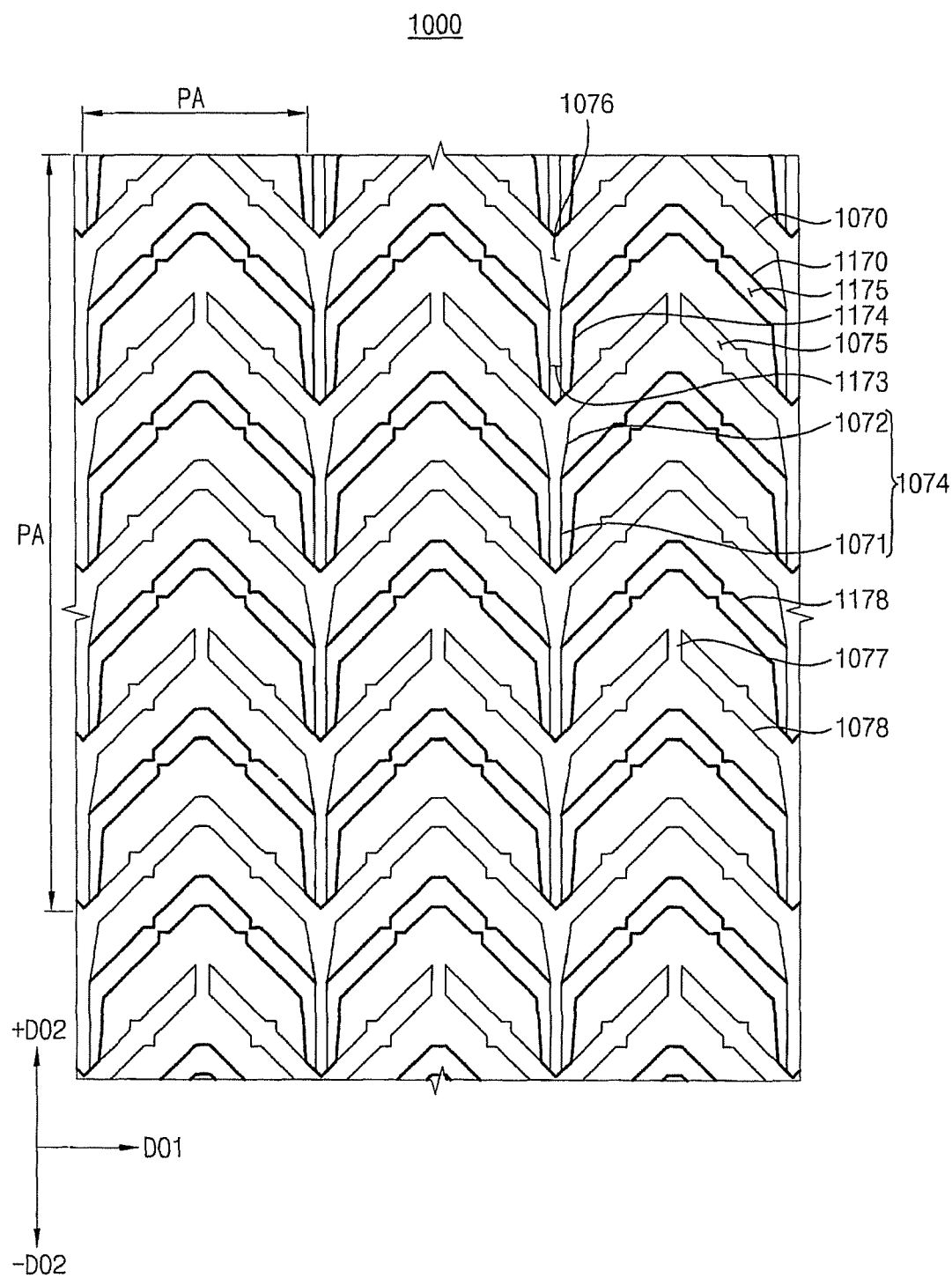
FIG. 12 is a plan view illustrating pixel areas of an LCD device in accordance with Embodiment 3 of the present invention.
Figure 13:
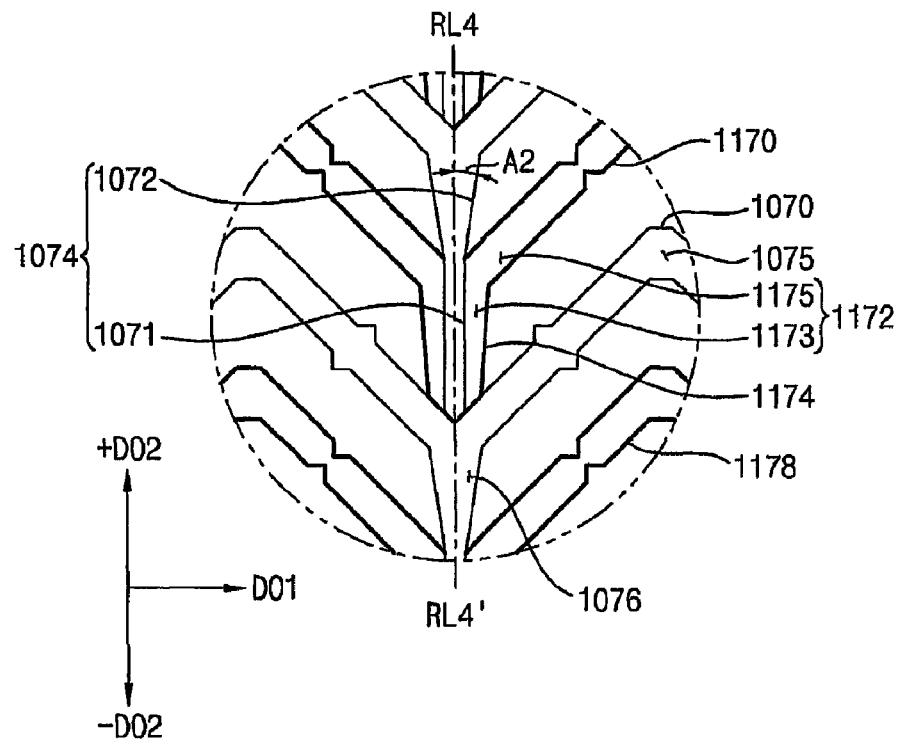
FIG. 13 is an enlarged plan view illustrating an exemplary embodiment of a portion of the pixel areas illustrated in FIG. 12.

FIG. 12 is a plan view illustrating pixel areas of an LCD device in accordance with Embodiment 3 of the present invention. FIG. 13 is an enlarged plan view illustrating an exemplary embodiment of a portion of the pixel areas illustrated in FIG. 12.

Referring to FIGS. 12 and 13, an LCD device 1000 includes components which are substantially the same as or similar to those of the LCD device 100 illustrated in FIGS. 1 to 7, except for the shape of a first edge 174 of a second slit part 176. Thus, the same or similar components will be referred to using the same reference numeral and any repetitive explanation will be omitted.

In one exemplary embodiment, a transparent conductive layer may be removed to form a first slit part 1075 and a second slit part 1076 of a pixel electrode 1070. The second slit part 1076 includes two first edges 1074 disposed opposite to each other in the first direction. Each of the first edges 1074 may form angles with respect to the positive second direction +D02. The second slit part 1076 may be substantially symmetrical with respect to a reference line RL4-RL4' which is substantially parallel to the second direction D02. The pixel electrode 1070 may be divided into a plurality of unit pixel electrode patterns arranged in the second direction D02 by the first and second slit parts 1075 and 1076. The unit pixel electrode patterns may be electrically connected to each other by a connection part 1077 to form a sub-pixel electrode. The first slit part 1075 includes two third edges 1078 opposing each other with respect to an area of the first slit part 1075. The connection part 1077 connects the two third edges 1078 at a second bent portion of the first slit part 1075.

A common electrode 1170 may include a third slit part 1172, which includes a domain dividing slit 1175 and a boundary slit 1173. The boundary slit 1173 may be longitudinally extended in the second direction D02, and overlap the second slit part 1076 of the pixel electrode 1070. The domain dividing slit 1175 may include fourth edges 1178 which are opposing each other and may be disposed between adjacent first slit parts 1075 in the plan view.

In Embodiment 3 of the present invention illustrated in FIGS. 12 and 13, each of the first edges 1074 may include a first side 1071 and a second side 1072. An entire of the first side 1071 may be substantially parallel to the second direction D02. The second side 1072 may be inclined at a second angle A2 with respect to the positive second direction +D02. The second side 1072 may be connected to the first side 1071, to define a continuous third slit part 1172. A width taken in the first direction D01 between the first sides 1071 may be substantially constant along the second direction D02, and a width between the second sides 1072 may increase toward the positive second direction +D02. The second angle A2 may be in a range of about 1° to about 30°. In one exemplary embodiment, the second angle A2 may be in a range of about 5° to about 20°.

The LCD device 1000 may have improved light transmissivity and response time that are substantially the same as or similar to those of the LCD device 100. However, the LCD device 1000 may have an aperture ratio that is greater than that of the LCD device 100 because the width between the first sides 1071 is constant so that an area covered by the light-blocking pattern (see 220, FIG. 3) may be decreased.

Embodiment 4

Figure 14:
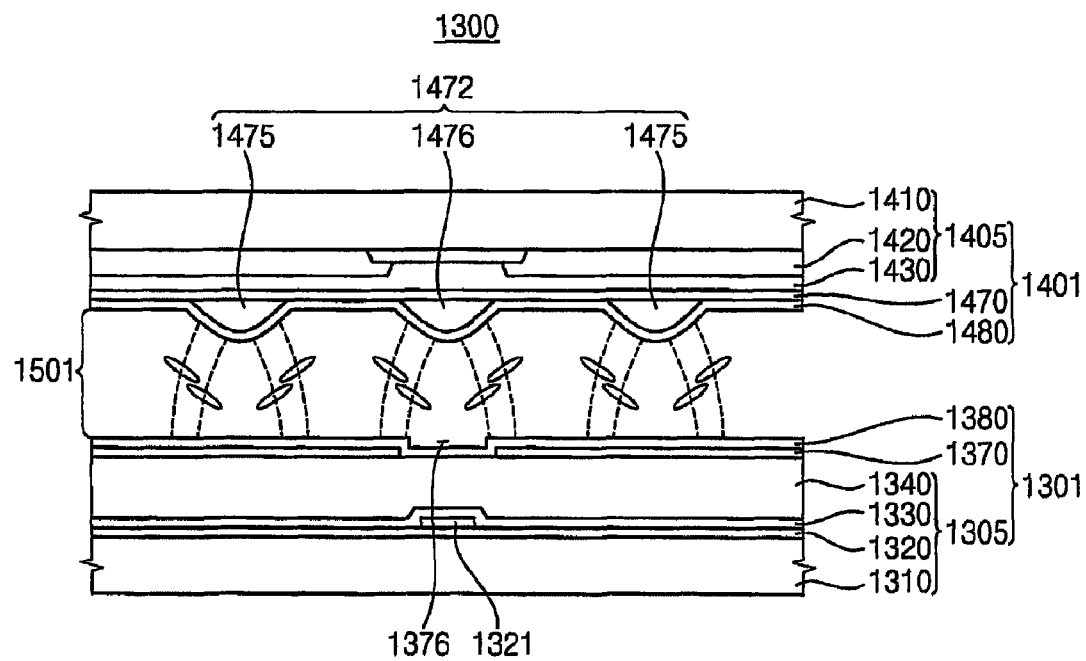
FIG. 14 is a cross-sectional view illustrating an LCD device in accordance with Embodiment 4 of the present invention.

FIG. 14 is a cross-sectional view illustrating an LCD device in accordance with Embodiment 4 of the present invention.

Referring to FIG. 14, an LCD device 1300 includes components which are substantially the same as or similar to those of the LCD device 100 illustrated in FIGS. 1 to 7, except that a protrusion pattern 1472 instead of the third slit part is disposed on the common electrode 1470. Thus, the same or similar components will be referred to using the same reference numeral and any repetitive explanation will be omitted.

The LCD device 1300 in accordance with Embodiment 4 of the present invention includes an array substrate 1301, an opposing substrate 1401 and a liquid crystal layer 1501. The opposing substrate 1401 includes an upper substrate 1405 and a common electrode 1470. The upper substrate 1405 may include an upper base substrate 1410, a light-blocking pattern 1420, a color filter pattern 1430 and an upper alignment layer 1480.

The array substrate 1301 includes a lower substrate 1305 and a pixel electrode 1370. The lower substrate 1305 may include a lower base substrate 1310. A data line 1321 may be disposed on a gate insulation layer 1320 and extend longitudinally in the second direction D02. A passivation layer 1330 may be disposed on the lower substrate 1305 including the data line 1321, and an organic insulation layer 1340 may be disposed on the passivation layer 1330. A lower alignment layer 1380 may be disposed to cover the pixel electrode 1370, and may overlap an entire of the lower base substrate 1310.

In Embodiment 4 of the present invention, the protrusion pattern 1472 may be disposed on an external surface of the common electrode 1470. In one exemplary, an organic insulation layer disposed on the common electrode 1470 may be patterned to form the protrusion pattern 1472.

The protrusion pattern 1472 may be disposed at a position which is substantially the same as the position at which the third slit part 272 of the LCD device 100 illustrated in FIGS. 1 to 7. The protrusion pattern 1472 may include a domain dividing protrusion 1475 corresponding to the domain dividing slit 275 illustrated in FIG. 2, and a boundary protrusion 1476 corresponding to the boundary slit 273 illustrated in FIG. 2.

The protrusion pattern 1472 may have functions that are substantially the same as or similar to those of the third slit part 272. When the electric field is applied to the liquid crystal layer 1501, the directors of the liquid crystal molecules disposed on one side with respect to the domain dividing protrusion 1475 may be arranged to be different from those disposed on the other side with respect to the domain dividing protrusion 1475. The short axes of the liquid crystal molecules may be arranged toward the domain dividing protrusion 1475 or the edges of the second slit part 1376.

The boundary protrusion 1476 may be disposed corresponding to the second slit part 1376. The width of the boundary protrusion 1476 may decrease toward the negative second direction −D02.

When compared to the third slit part 272 disposed in the common electrode, the protrusion pattern 1472 of the LCD device 1300 may uniformly arrange the liquid crystal molecules.

According to the LCD device in accordance with the exemplary embodiments of the present invention, liquid crystal disposed in boundary regions of slit parts which are disposed in a pixel electrode may be well controlled and the response time of the liquid crystal may be improved. In addition, the slit parts and a protrusion pattern may be respectively disposed in the pixel electrode and a common electrode to divide a pixel area into a plurality of domains. Therefore, the LCD device may display improved images.

The foregoing is illustrative of the present invention and is not to be construed as limiting thereof. Although a few exemplary embodiments of the present invention have been described, those skilled in the art will readily appreciate that many modifications are possible in the exemplary embodiments without materially departing from the novel teachings and advantages of this invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The present invention is defined by the following claims, with equivalents of the claims to be included therein.

What is claimed is:

1. A liquid crystal display device comprising:
    a first substrate including:
        a lower substrate including a pixel area; and
        a pixel electrode disposed in the pixel area, the pixel electrode including:
            a first slit part extending along a first direction in a first substantially zigzag shape, and
            a second slit part extending along a second direction substantially perpendicular to the first direction, and overlapping a first bent portion of the first slit part, the second slit part including first edges disposed opposite to each other, disposed inclined at a first angle and disposed substantially symmetrical to each other with respect to the second direction;
    a second substrate including:
        an upper substrate facing the lower substrate; and
        a common electrode disposed on the upper substrate and including a third slit part disposed between adjacent first slit parts, overlapping the second slit part and extended in a second substantially zigzag shape; and
    a liquid crystal layer disposed between the pixel electrode and the common electrode.

2. The LCD device of claim 1, wherein the third slit part of the common electrode comprises:
    a domain dividing slit extending along the first direction in a substantially zigzag shape; and
    a boundary slit overlapping the second slit part of the pixel electrode, the boundary slit disposed extended along a boundary between adjacent pixel areas and extending from a bent portion of the domain dividing slit toward a negative second direction.

3. The LCD device of claim 2, wherein the boundary slit of the common electrode extends to the first bent portion of the first slit part of the pixel electrode, and a width between second edges of the boundary slit disposed opposite to each other is greater than a width between the first edges of the second slit part of the pixel electrode.

4. The LCD device of claim 3, wherein each of the first edges of the second slit part of the pixel electrode comprises:
    a first side inclined at the first angle with respect to a positive second direction, the first side being substantially parallel to the second edge of the common electrode;
    a second side inclined at a second angle with respect to the positive second direction and separated from the first side toward the positive second direction; and
    a third side inclined at a third angle, the third side connecting the first side with the second side.

5. The LCD device of claim 4, wherein a width between the first sides of the first edges decreases toward the negative second direction, and a width between the second sides of the first edges increases toward the positive second direction.

6. The LCD device of claim 5, wherein the first angle and the second angle are in a range of about 1° to about 30°.

7. The LCD device of claim 3, wherein each of the first edges of the second slit part of the pixel electrode comprises:
    a first side inclined at a first angle with respect to the positive second direction; and
    a second side inclined at a second angle with respect to the positive second direction, the second side continuous with the first side.

8. The LCD device of claim 7, wherein a width between the first sides of the first edges of the second slit part of the pixel electrode increases toward the negative second direction, a width between the second sides of the first edges of the second slit part of the pixel electrode increases toward the positive second direction, and a width between the second edges of the boundary slit of the common electrode corresponding to the first sides of the first edges decreases toward the negative second direction.

9. The LCD device of claim 8, wherein the first angle and the second angle are in a range of about 1° to about 30°.

10. The LCD device of claim 3, wherein each of the first edges of the second slit part of the pixel electrode comprises:
    a first side substantially parallel to the second direction; and
    a second side forming the first angle with respect to the second direction and extending from the first side toward the positive second direction.

11. The LCD device of claim 10, wherein a width between the first sides of the first edges of the second slit part of the pixel electrode is substantially constant, a width between the second sides of the first edges of the second slit part of the pixel electrode increases toward the positive second direction, and the width between the second edges of the boundary slit of the common electrode corresponding to the first sides decreases toward the negative second direction.

12. The LCD device of claim 3, further comprising a plurality of first slit parts each having a substantially inverted V-shape, wherein the plurality of first slit parts is disposed along the positive second direction in each pixel area, the domain dividing slit is disposed between adjacent first slit parts of the plurality of first slit parts, and the domain dividing slit and the boundary slit are connected to each other to form a substantially Y-shape.

13. The LCD device of claim 12, further comprising a connection part disposed at a second bent portion of the first slit part of the pixel electrode to connect third edges of the first slit part which are opposite to each other.

14. The LCD device of claim 12, wherein the first slit part of the pixel electrode and the domain dividing slit of the common electrode are inclined at about +45° or about −45° with respect to the positive second direction.

15. The LCD device of claim 3, wherein the lower substrate further includes:
   a lower base substrate including a pixel area;
   a gate line disposed between the lower base substrate and the pixel electrode, the gate line extending in the first direction;
   a data line disposed between the lower base substrate and the pixel electrode, the data line corresponding to the second slit part and extending in the second direction; and
   a switching element including a gate electrode extending from the gate line, a source electrode extending from the data line and a drain electrode electrically connected to the pixel electrode.

16. The LCD device of claim 15, wherein the upper substrate comprises:
   an upper base substrate on which the common electrode is disposed;
   a light-blocking pattern disposed between the upper substrate and the common electrode to correspond to the switching element, the gate line and the data line; and
   a color filter disposed on a portion of the upper substrate exposed by the light-blocking pattern, the color filter corresponding to the pixel area.

17. The LCD device of claim 16, wherein third edges of the first slit part of the pixel electrode, which are opposite to each other, and fourth edges of the domain dividing slit of the common electrode, which are opposite to each other, comprise a depressed notch or a raised notch.

18. The LCD device of claim 16, wherein a singular point is generated in a region between the first edges of the second slit part of the pixel electrode, which is covered by the light-blocking pattern, when an electric field is applied to the liquid crystal layer.

19. The LCD device of claim 15, wherein the pixel electrode further includes a first sub-pixel electrode and a second sub-pixel electrode which are electrically independent from each other by the first and second slit parts, and
   wherein the switching element comprises:
      a first thin-film transistor electrically connected to the first sub-pixel electrode and a first data line of the data line; and
      a second thin-film transistor electrically connected to the second sub-pixel electrode and a second data line of the data line.

20. The LCD device of claim 19, wherein the lower substrate further includes:
   a first storage line defining a first storage capacitor with the first drain electrode of the first thin-film transistor;
   a second storage line defining a second storage capacitor with the second drain electrode of the second thin-film transistor; and
   an organic insulation layer disposed between the switching element and the pixel electrode.

* * * * *